2 Sheets--Sheet 1.

C. HOOD.
Cooking Apparatus.

No. 137,843. Patented April 15, 1873.

Witnesses:
Geo. H. Howard.
N. A. Daniels.

Cornelius Hood Inventor.
Charles S. Whitman Attorney

AM. PHOTO-LITHOGRAPHIC CO. N.Y. (OSBORNE'S PROCESS)

2 Sheets--Sheet 2.

C. HOOD.
Cooking Apparatus.

No. 137,843.  Patented April 15, 1873.

Fig.

Witnesses:  Cornelius Hood Inventor,
Chas. H. Isham  Charles S. Whitman Attorney
H. A. Daniels

AM. PHOTO-LITHOGRAPHIC CO. N.Y.(OSBORNE'S PROCESS.)

UNITED STATES PATENT OFFICE.

CORNELIUS HOOD, OF SENECA FALLS, NEW YORK.

IMPROVEMENT IN COOKING APPARATUS.

Specification forming part of Letters Patent No. 137,843, dated April 15, 1873; application filed February 12, 1873.

*To all whom it may concern:*

Be it known that I, CORNELIUS HOOD, of Seneca Falls, county of Seneca and State of New York, have invented certain Improvements in Cooking and Steaming Apparatus.

The following description, taken in connection with the accompanying plate of drawing hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of culinary apparatus in which steam is utilized for the purpose of cooking meats, vegetables, &c., and to that class of devices which are made use of in connection with boilers for the purpose of causing the steam generated therein to escape into the fire and pass away with the products of combustion. The nature of my invention consists in certain improvements in the construction of such apparatus and devices, hereinafter set forth.

Figure 2:
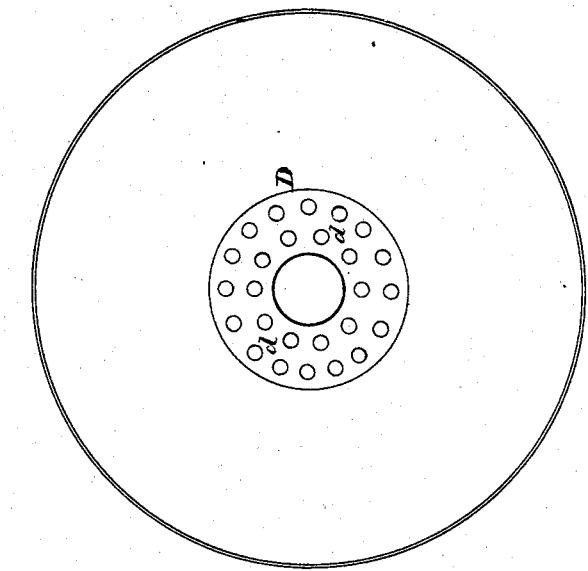
Figure 1:
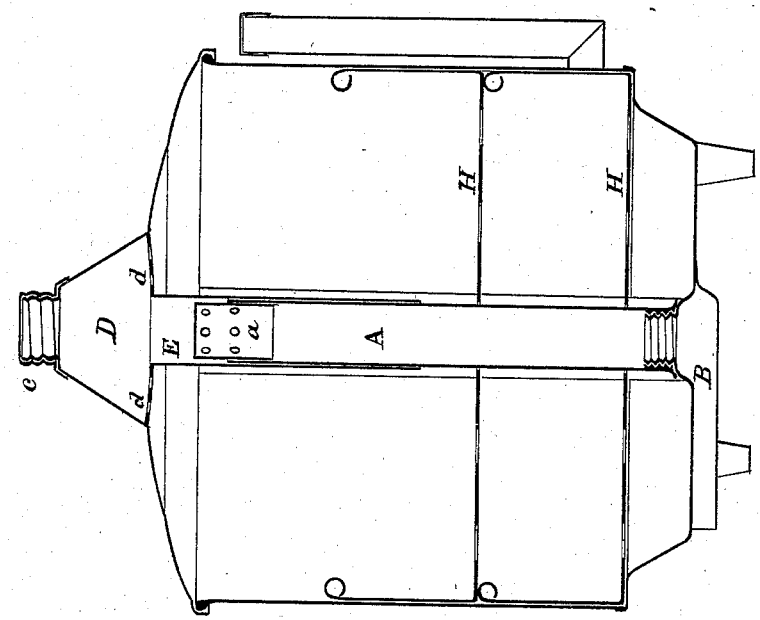
Figure 3:
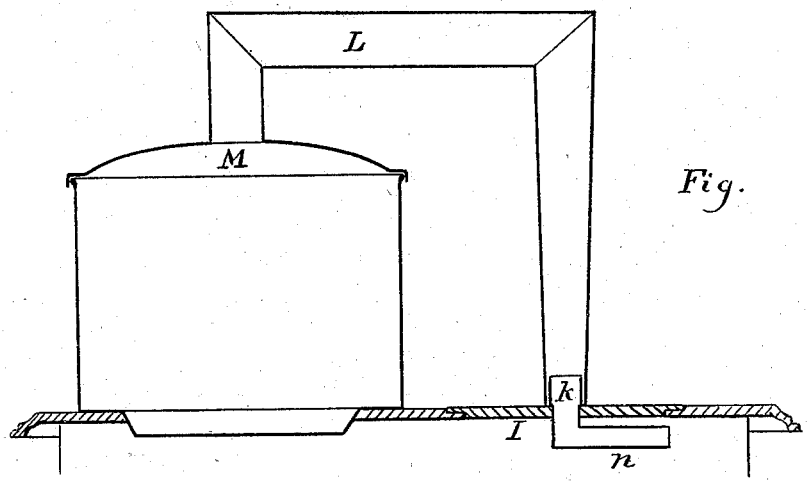
Figure 4:
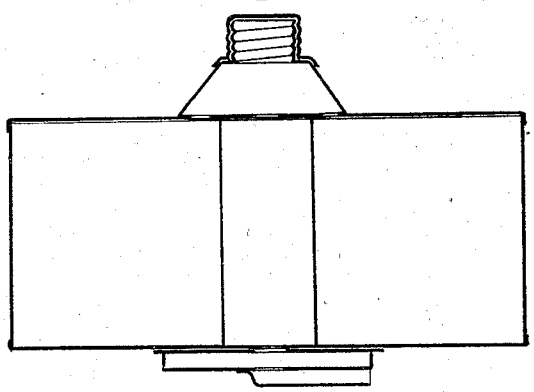
Figure 5:
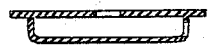

In the accompanying plate of drawing, which illustrates my invention and forms a part of the specification thereof, in which corresponding parts are illustrated by similar letters, Figure 1 is a vertical section through the center of a culinary boiler or steam cooking apparatus with my improvements applied thereto. Fig. 2 is a plan of the under side of the cover. Fig. 3 is a transverse vertical section of another apparatus. Fig. 4 is a modification of Fig. 1. Fig. 5 is a modification of stove-cover shown in Fig. 3.

The construction, operation, and relative arrangement of the component parts of my invention are as follows: A boiler of any of the ordinary forms made use of for cooking or steaming is provided with the upright tube A, the base of which connects with a circular aperture in the bottom thereof, and forms, in connection with the semi-cylindrical opening B, an exit-pipe for the escape of the steam and odors evolved in cooking. The cover of the boiler is provided with the condensing-chamber D, having apertures $d$, through which the steam passes, and connecting-tube E, the end of which closely fits about or within the upright tube A. The condensing-chamber may be opened with facility by means of the screw-stopper $c$.

*Operation.*

The articles to be cooked having been placed upon the movable supports H, and the proper amount of water placed in the boiler, the steam generated passes through the apertures $d$ into the condensing-chamber, and from thence downward through the central pipes into the horizontal flue B, from whence it escapes with the products of combustion.

The tube A, it will be observed, may be detached with facility by unscrewing it from its seat, and by stopping up the hole in the bottom of the vessel it may be used as an ordinary boiler. The said tube A may be provided with a valve or stopper, $a$, of the form shown, by means of which the degree of the flow of steam may be regulated.

A stove-cover, I, of the proper size is provided with a projection, $k$, over which is fitted a tube, L, which communicates with the cover M of an ordinary culinary boiler, or other vessel within which the process of cooking or the generation of steam is going on. An aperture is cut through the cover I or in such a manner as to form a connection between the tube L and the tube $n$ attached to the under side of the cover.

The fumes evolved in cooking, it will be readily perceived, will be conducted from the boiler or other culinary utensil which may be used through the tubing and stove-cover, and discharged with the products of combustion.

Having described the construction and operation of my invention, I will state what I claim and desire to secure by Letters Patent in the following clauses:

1. In a culinary boiler or steaming apparatus, the combination of the condensing-chamber D provided with a removable top, $c$, and pipe E, the detachable tube A provided with a valve or stopper, $a$, and the exit-pipe B, all constructed and operating together as and for the purposes described.

2. A stove-cover provided with an aperture, as described, when combined with a tube connected with a boiler or other culinary vessel.

In testimony that I claim the foregoing I have hereunto set my hand.

CORNELIUS HOOD.

Witnesses:
  JOS. T. K. PLANT,
  CHAS. H. ISHAM.